United States Patent
Bailie et al.

(10) Patent No.: US 8,075,740 B2
(45) Date of Patent: Dec. 13, 2011

(54) METHOD AND SYSTEM FOR TREATING FEEDWATER

(75) Inventors: Robert E. Bailie, The Woodlands, TX (US); Robert R. Wright, Big Canoe, GA (US)

(73) Assignees: AHT Solutions, LLC, The Woodlands, TX (US); Watervap, LLC, Marble Hill, GA (US)

(*) Notice: Subject to any disclaimer, the term of this patent is extended or adjusted under 35 U.S.C. 154(b) by 0 days.

(21) Appl. No.: 12/494,042

(22) Filed: Jun. 29, 2009

(65) Prior Publication Data

US 2009/0283396 A1 Nov. 19, 2009

Related U.S. Application Data

(63) Continuation-in-part of application No. 11/880,338, filed on Jul. 20, 2007.

(51) Int. Cl.
*B01D 1/18* (2006.01)
*B01D 1/28* (2006.01)
*B01D 3/06* (2006.01)
*B01D 61/02* (2006.01)
*B01D 61/36* (2006.01)

(52) U.S. Cl. ............ 202/176; 159/2.1; 159/3; 159/24.2; 159/48.1; 159/46; 159/DIG. 3; 159/DIG. 28; 202/177; 202/182; 203/10; 203/24; 203/26; 203/88; 203/90; 203/DIG. 16; 210/652

(58) Field of Classification Search .............. 159/2.1, 159/3, 24.1, 24.2, 46, 48.1, DIG. 3, DIG. 27, 159/DIG. 28; 202/176, 177, 182; 210/251, 210/500.21, 652; 34/90; 203/10, 24, 26, 203/88, 90, DIG. 8, DIG. 16
See application file for complete search history.

(56) References Cited

U.S. PATENT DOCUMENTS

| | | | |
|---|---|---|---|
| 2,890,179 A * | 6/1959 | Kimberlin, Jr. et al. | 502/8 |
| 2,921,004 A | 1/1960 | Wood | |
| 3,147,598 A | 9/1964 | Wilson | |
| 3,520,066 A | 7/1970 | Meade | |
| 3,522,151 A | 7/1970 | Dismore | |
| 3,895,994 A | 7/1975 | Saguchi et al. | |
| 3,933,600 A | 1/1976 | Dodge et al. | |
| 4,793,937 A | 12/1988 | Meenan et al. | |
| 4,822,737 A * | 4/1989 | Saida | 435/162 |
| 4,963,226 A | 10/1990 | Chamberlain | |
| 5,206,047 A * | 4/1993 | Crandall et al. | 426/599 |
| 5,223,088 A | 6/1993 | Hansen | |
| 5,314,579 A * | 5/1994 | Sung | 159/47.1 |
| 5,972,835 A * | 10/1999 | Gupta | 502/439 |
| 6,299,735 B1 | 10/2001 | Lumbreras | |

(Continued)

FOREIGN PATENT DOCUMENTS

GB 2394678 * 5/2004

*Primary Examiner* — Virginia Manoharan
(74) *Attorney, Agent, or Firm* — Preti Flaherty Bellveau & Pachios LLP

(57) ABSTRACT

A system for treating feedwater includes a fluidized bed heat exchanger unit connected to receive feedwater and a flash concentrator column connected to receive feedwater discharged from the fluidized bed heat exchanger unit. A spray dryer is provided to receive a solids/liquid slurry discharged from the flash concentrator column. Feedwater can be treated by converting dissolved solids in the feedwater to suspended solids, vaporizing a portion of the feedwater to produce a solids/liquid slurry, and separating solids from the solids/liquid slurry.

6 Claims, 8 Drawing Sheets

U.S. PATENT DOCUMENTS

| | | |
|---|---|---|
| 6,350,928 B1 | 2/2002 | Waycuilis et al. |
| 6,699,369 B1 | 3/2004 | Hartman et al. |
| 6,820,865 B2 | 11/2004 | Low |
| 6,962,006 B2 | 11/2005 | Chickering, III et al. |
| 7,070,694 B2 * | 7/2006 | Colling et al. ................ 210/640 |
| 2005/0224404 A1 | 10/2005 | Chancellor |
| 2006/0088642 A1 * | 4/2006 | Boersen et al. ............... 426/583 |
| 2007/0045100 A1 | 3/2007 | Wright |

* cited by examiner

METHOD AND SYSTEM FOR TREATING FEEDWATER

CROSS REFERENCES TO RELATED APPLICATIONS

This application is a Continuation-In-Part of copending U.S. patent application Ser. No. 11/880,338, filed Jul. 20, 2007.

BACKGROUND OF THE INVENTION

This invention relates generally to systems and methods for treating liquids carrying suspended or dissolved solids and more particularly to separating the solids from the liquid in order to recover reusable liquids such as potable water and/or dry solids.

Throughout the world there exists an ever-increasing number of operating facilities faced with brine or wastewater disposal problems. These aqueous solution disposal problems span a wide range of industries including oil & gas production, food processing, ethanol production and inland brackish water desalination. Suspended solids can be readily removed using conventional separation technologies. However, the removal of dissolved solids and contaminants in solution often requires numerous unit processes and can lead to ponding or storage of these liquid wastes while awaiting a cost-effective disposal solution. The negative impact of these problems grows significantly when the ponding approach leads to the contamination of a groundwater and/or surface water resource.

Several methods are known for treating wastewaters and other brines, as well as for the desalination of seawater and brackish waters. Notable techniques include mechanical vapor recompression (MVR) evaporator systems that have been widely accepted and applied within numerous inland power plants to achieve zero liquid discharge (ZLD), particularly in water-short regions of the U.S. These systems are believed to be capable of concentrating brine to a maximum of 200,000 ppm (20%) total dissolved solids (TDS), prior to any subsequent processing in pursuit of ZLD.

Most conventional evaporator systems have a significant potential for fouling or scaling of the heat transfer surfaces resulting from the precipitation of solids as the concentration level is increased. The addition of scale control chemicals to eliminate scaling constituents within the seawater fed to seawater desalination evaporator systems is common practice. Of particular concern within any brine concentrator system are the inverse solubility constituents, including calcium carbonate (CaCO3), calcium sulfate (CaSO4), and magnesium hydroxide (MgOH), that will begin to precipitate on the heat transfer surfaces at temperatures above 120 F. The fouling or scaling of heat transfer surfaces continues to be a major area of concern within the field of seawater desalination wherein the brine concentration rarely, if ever, exceeds about 100,000 ppm or 10% TDS.

Accordingly, there is a need for a cost-effective solution to the problems encountered in treating saltwater, wastewater and/or non-aqueous solutions to recover reusable water (or other liquid) and/or dry solids.

SUMMARY OF THE INVENTION

The above-mentioned need is met by the present invention, which provides methods and systems for treating feedwater. One embodiment provides a system that includes a fluidized bed heat exchanger unit connected to receive feedwater and a flash concentrator column connected to receive feedwater discharged from the fluidized bed heat exchanger unit. A spray dryer is provided to receive a solids/liquid slurry discharged from the flash concentrator column. In one aspect, the fluidized bed heat exchanger unit converts dissolved solids in the feedwater to suspended solids. A portion of this feedwater is vaporized in the flash concentrator column to produce a solids/liquid slurry. The spray dryer separates solids from the solids/liquid slurry.

The present invention and its advantages over the prior art will be more readily understood upon reading the following detailed description and the appended claims with reference to the accompanying drawings.

DESCRIPTION OF THE DRAWINGS

The subject matter that is regarded as the invention is particularly pointed out and distinctly claimed in the concluding part of the specification. The invention, however, may be best understood by reference to the following description taken in conjunction with the accompanying drawing figures in which:

DETAILED DESCRIPTION OF THE INVENTION

Figure 1:
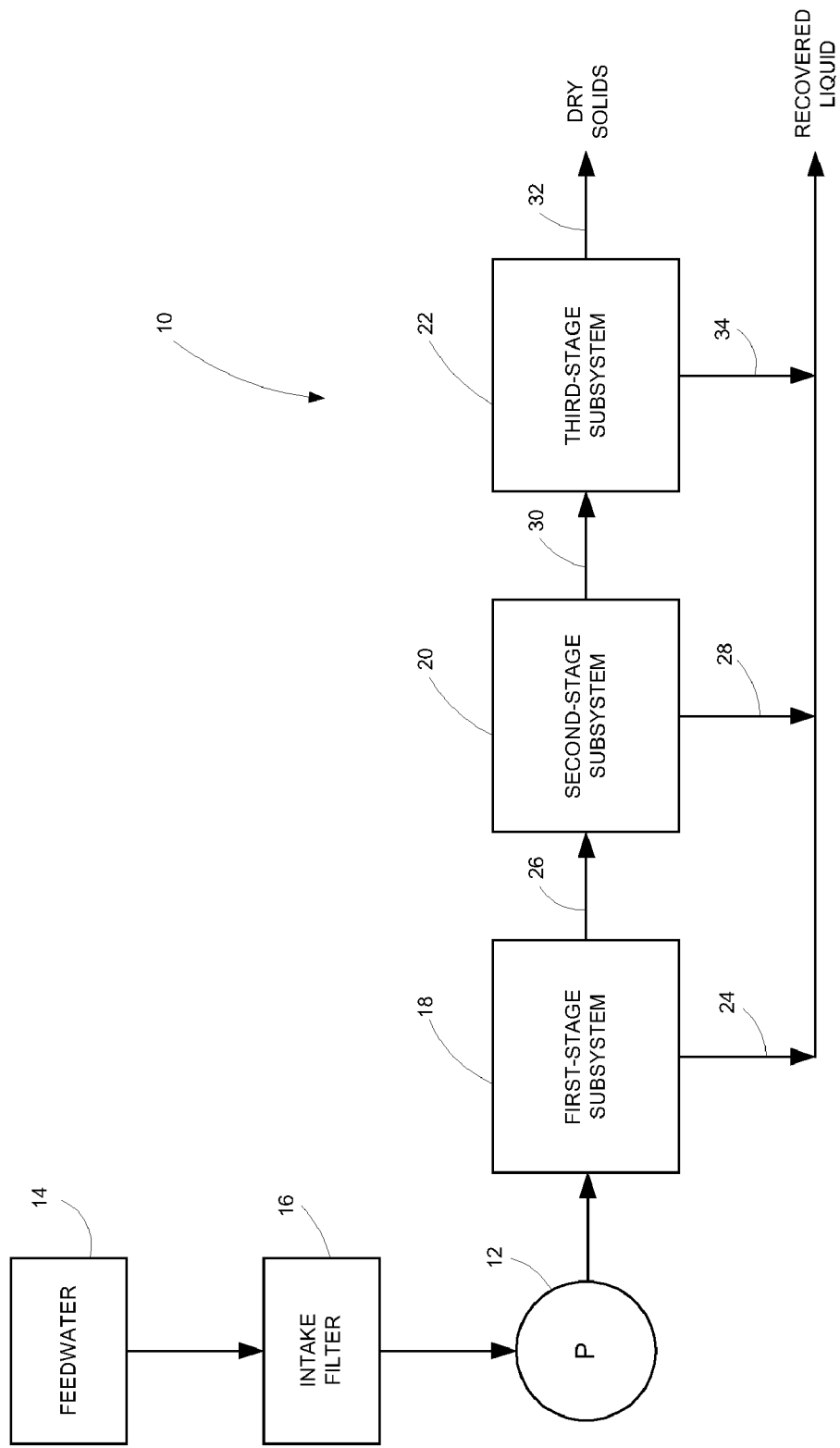
FIG. 1 is a schematic view of a system for treating liquids carrying suspended or dissolved solids by separating the solids from the liquid.

Referring to the drawings wherein identical reference numerals denote the same elements throughout the various views, FIG. 1 shows a multi-stage system 10 for treating liquids carrying suspended or dissolved solids by separating the solids from the liquid. The system 10 is useful for treating aqueous solutions and/or suspensions, but can also be used for treating liquids other than water-based mixtures. The system 10 is particularly applicable for desalinizing seawater by removing salt to provide potable water. Additional treatable solutions and/or suspensions include industrial wastewater and other brines. For purposes of convenience, the liquid being treated by system 10 is referred to herein as the "feedwater," which is intended to include any type of liquid carrying suspended and/or dissolved solids.

The system 10 includes a supply pump 12 that pumps raw feedwater from a source 14 through an intake filter 16. The intake filter 16, which is preferably connected to the suction pipe of the supply pump 12, filters the feedwater to remove any large particles that may be suspended in the feedwater.

Removing large particles from the feedwater prevents these particles from creating clogs downstream in the system 10.

In the illustrated embodiment, the system 10 includes three stages for treating the filtered feedwater discharged from the supply pump 12: a first-stage subsystem 18, a second-stage subsystem 20, and a third-stage subsystem 22. The system 10 combines the concentration and separation technologies of each of the three subsystems to separate the solids from the liquid in the feedwater. The system 10 is thus able to recover clean, purified liquid and produce dry solids for reuse or ultimate disposal. When treating an aqueous feedwater, the recovered liquid will be of potable water quality.

The first-stage subsystem 18 is connected to receive the filtered feedwater discharged from the supply pump 12. The filtered feedwater undergoes an initial or preliminary concentration step in the first-stage subsystem 18. The first-stage subsystem 18 uses any suitable technology, such as high pressure reverse osmosis systems and/or mechanical vapor recompression (MVR) evaporator systems, to separate some but not all of liquid from the feedwater. The separated liquid is substantially free of the dissolved and suspended solids such that all or very nearly all of the solids are retained in the portion of the feedwater that is not separated. This remaining feedwater has a higher concentration of solids (i.e., higher salinity) than the feedwater entering the first-stage subsystem 18. The first-stage subsystem 18 thus receives filtered feedwater from the supply pump 12 and outputs a first stream of purified liquid 24, which can be recovered for subsequent reuse, and a stream of pre-concentrated feedwater 26.

The pre-concentrated feedwater 26 output from the first-stage subsystem 18 is conveyed to the second-stage subsystem 20, where it is further concentrated while additional purified liquid, such as high quality potable water, is recovered. In one embodiment, the second-stage subsystem 20 utilizes fluidized bed heat exchanger technology to separate a solids/liquid slurry from the pre-concentrated feedwater 26. This is accomplished by separating additional liquid that is substantially free of solids from the pre-concentrated feedwater 26. The remaining feedwater retains all or very nearly all of the solids and generally forms a solids/liquid slurry having a higher concentration of solids than the pre-concentrated feedwater 26. The second-stage subsystem 20 thus receives the pre-concentrated feedwater 26 and outputs a second stream of purified liquid 28, which can be recovered for subsequent reuse, and a solids/liquid slurry 30.

The solids/liquid slurry 30 is fed to the third-stage subsystem 22, which uses spray-drying technology to achieve a final separation of the solids from the slurry 30. More specifically, the third-stage subsystem 22 vaporizes the liquid component of the solids/liquid slurry 30 to separate the solids from the liquid. The resulting outputs from the third-stage subsystem 22 comprise dry solids 32 and vapor 34. The vapor 34 can be condensed and recovered as purified liquid (as shown in FIG. 1), or alternatively can be discharged to the atmosphere as contaminate-free vapor.

Figure 2:
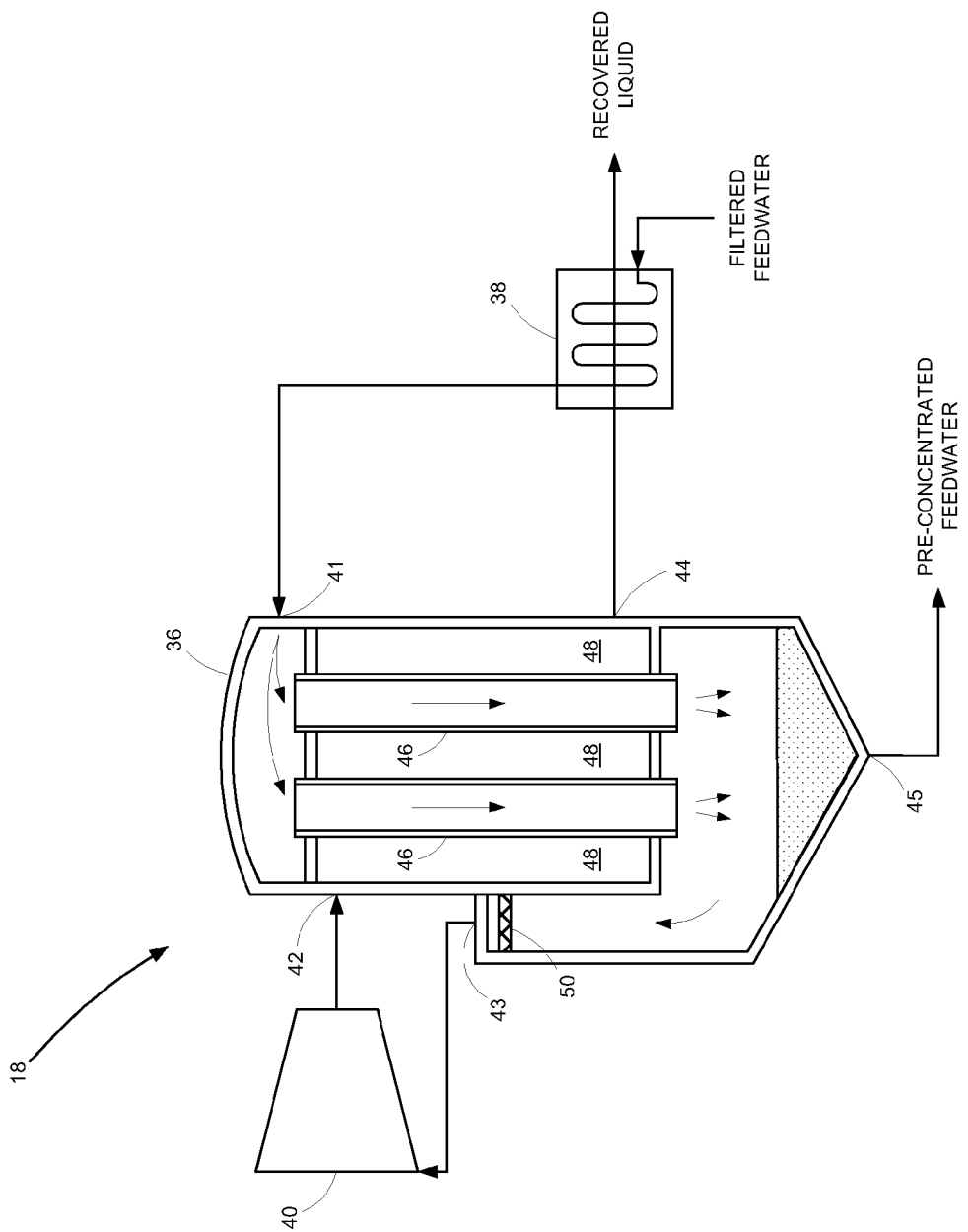
FIG. 2 is a schematic view of one embodiment of a first-stage subsystem that can be used in the system of FIG. 1.

FIG. 2 shows one possible embodiment of the first-stage subsystem 18. In this case, the first-stage subsystem 18 comprises a distillation vessel 36, a heat exchanger 38, and a compressor 40. The distillation vessel 36 has first and second inlets 41 and 42 and first, second and third outlets 43, 44 and 45. A plurality of open-ended tubes 46 is vertically disposed inside the distillation vessel 36. The lower ends of the tubes 46 are open to a lower section of the distillation vessel 36, while the upper ends of the tubes 46 are open to an upper section of the distillation vessel 36. The tubes 46 are spatially separated from one another, providing an interstitial space 48 therebetween. The interstitial space 48 is in fluid isolation from the interiors of the tubes 46 and the lower and upper sections of the distillation vessel 36. The first inlet 41 opens into the upper section of the distillation vessel 36, and the second inlet 42 opens into the interstitial space 48. The first outlet 43 exits from the lower section of the distillation vessel 36, the second outlet 44 exits from the interstitial space 48, and the third outlet 45 exits from the bottom of the lower section of the distillation vessel 36.

In operation, filtered feedwater from the supply pump 12 (not shown in FIG. 2) is pumped through the heat exchanger 38, where it is heated, and this heated feedwater is sprayed into the upper section of the distillation vessel 36 through the first inlet 41. The feedwater flows downward through the tubes 46 where it is further heated by hot vapor in the interstitial space 48. Specifically, the feedwater flowing through the tubes 46 is heated to a temperature sufficient to undergo a partial vaporization such that some, but not all, of the feedwater is vaporized in the tubes 46. The vapor is substantially free of the solids that are dissolved or suspended in the feedwater because the solids become separated from the vapor phase of the liquid during evaporation. All or very nearly all of the solids are retained in the portion of the feedwater that is not vaporized, which consequently has a higher concentration than the feedwater entering the distillation vessel 36.

The vapor is discharged through the first outlet 43 (after passing through a demisting screen 50), and the liquid, non-vaporized portion of the feedwater is collected in the lower section of the distillation vessel 36. The discharged vapor is conveyed to the compressor 40. The compressor 40 compresses the vapor, increasing its pressure and temperature. This hot vapor, which in the case of aqueous feedwaters can be steam, is conveyed into the interstitial space 48 of the distillation vessel 36 via the second inlet 42. The hot vapor in the interstitial space 48 is in fluid contact with the external surfaces of the tubes 46. The tubes 46 are formed from a heat conductive material so that heat is transferred from the hot vapor to the feedwater passing through the tubes 46, causing the above-mentioned partial vaporization of the feedwater. The heat transfer also causes the hot vapor to condense into clean, treated liquid that is discharged from the second outlet 44. This liquid, which becomes the recovered liquid 24, is passed through the heat exchanger 38 to heat incoming feedwater. The feedwater collected in the lower section of the distillation vessel 36 is discharged through the third outlet 45 as the pre-concentrated feedwater 26. A portion of this discharge can be recirculated and mixed with the feedwater being fed to the distillation vessel 36 through the first inlet 41.

Figure 3:
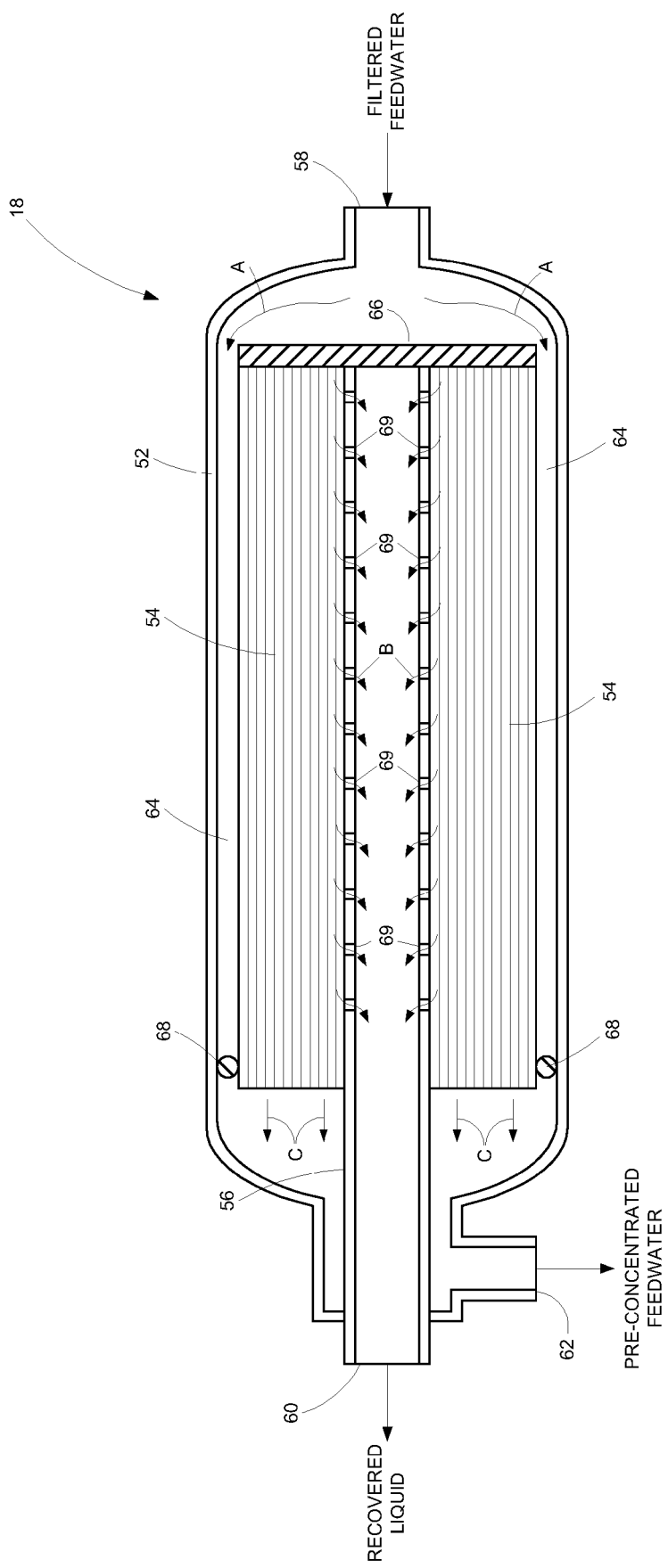
FIG. 3 is a schematic view of another embodiment of a first-stage subsystem that can be used in the system of FIG. 1.

FIG. 3 shows another possible embodiment of the first-stage subsystem 18. In this case, the first-stage subsystem 18 is a reverse osmosis system comprising a substantially cylindrical vessel 52, a tubular, semi-permeable membrane 54 disposed in the vessel 52, and a central tube 56 that is positioned coaxially inside the vessel 52 and supports the membrane 54. The vessel 52 has an inlet 58 formed at one end thereof and first and second outlets 60 and 62 formed at the other end thereof. The tubular membrane 54 has a slightly smaller diameter than the vessel 52 so as to create a substantially annular gap or space 64 between the outer surface of the membrane 54 and the inner surface of the vessel 52. An impermeable plate 66 blocks the first end of the membrane 54, adjacent to the inlet 58. The second end of the membrane 54, adjacent to the outlets 60 and 62, is open. The gap 64 defines a flowpath for feedwater entering the vessel 52 through the inlet 58. This flowpath is closed by an O-ring 68 positioned in the gap 64 near the second end of the membrane 54.

The central tube 56 extends longitudinally from the plate 66 and out through the opposite end of the vessel 52 to define the first outlet 60. The portion of the central tube 56 in contact with the membrane 54 has a plurality of openings 69 formed therein. This portion of the central tube 56 is thus porous to permit feedwater that permeates the membrane 54 to enter the tube interior and then exit the vessel 52 via the first outlet 60.

In operation, filtered feedwater from the supply pump 12 (not shown in FIG. 3) enters the vessel 52 through the inlet 58 and floods the gap 64 between the membrane 54 and the inner surface of the vessel 52 (as shown by arrows A). The feedwater thus passes over the membrane 54. A portion of the feedwater fully permeates the membrane 54 and enters the interior of the central tube 56 through the openings 69 (as shown by arrows B). This portion of the feedwater, typically referred to as the permeate, is substantially free of dissolved and suspended solids and is discharged through the first outlet 60 as the recovered liquid 24. The remainder of the feedwater does not fully permeate the membrane 54 and flows out the second end of the membrane 54 (as shown by arrows C). This portion of the feedwater, typically referred to as the reject, is discharged via the second outlet 62. Solids removed from the permeate are flushed away with the reject stream and do not accumulate on the membrane 54. The feedwater discharged through the second outlet 62, which is the pre-concentrated feedwater 26, thus has a higher concentration of solids than the feedwater entering the vessel 52 through the inlet 58.

Figure 4:
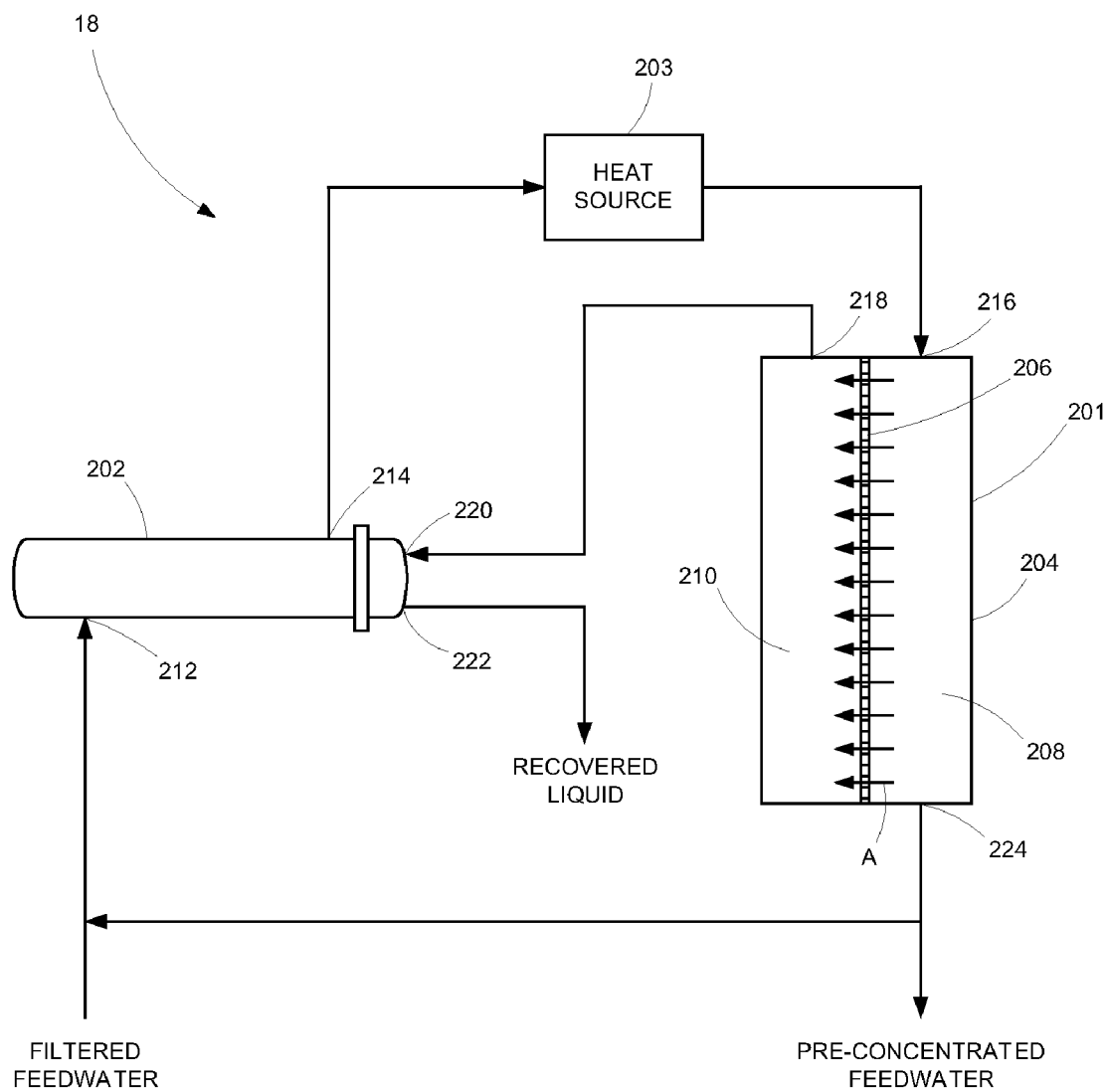
FIG. 4 is a schematic view of yet another embodiment of a first-stage subsystem that can be used in the system of FIG. 1.

FIG. 4 shows yet another possible embodiment of the first-stage subsystem 18. In this case, the first-stage subsystem 18 is a membrane distillation system that includes a membrane unit 201, a condenser 202 and a heat source 203. The membrane unit 201 comprises a housing 204 having a hydrophobic membrane 206 disposed in the interior of the housing 204. The membrane 206 is situated so as to divide the interior of the housing 204 into first and second chambers 208 and 210 located in a side-by-side fashion. As shown in FIG. 4, the membrane unit 201 has a single membrane 206, but the membrane unit 201 could alternatively comprise an array of hydrophobic membranes defining the two chambers 208 and 210. The membrane 206 is a porous hydrophobic membrane that allows water vapor to pass through but does not allow water droplets to pass. The hydrophobic membrane 206 can be made from a variety of materials; one particularly suitable material is polytetrafluoroethylene (PTFE) (TEFLON®), which is naturally hydrophobic.

In operation, filtered feedwater from the supply pump 12 (not shown in FIG. 4) enters the condenser 202 through a first inlet 212 and exits through a first outlet 214. The feedwater discharged from the first outlet 214 (which is heated in the condenser 202 as described below) is heated further by the heat source 203. The heat source 203 can be any source, or combination of sources, of heat. The feedwater is heated to a temperature sufficient to undergo a partial vaporization such that some, but not all, of the feedwater is vaporized, resulting in a two-phase (liquid and vapor) mixture. Because the solids are separated from the vapor phase during evaporation, the water vapor is substantially free of the solids that are dissolved or suspended in the feedwater. The two-phase (liquid and vapor) mixture is fed to an inlet 216 of the membrane unit 201 that opens into the first chamber 208. The two-phase mixture thus flows into the first chamber 208 on one side of the hydrophobic membrane 206. From here, the water vapor in the two-phase mixture passes through the hydrophobic membrane 206 into the second chamber 210 (as shown by arrows A), while the liquid portion of the two-phase mixture does not pass through the hydrophobic membrane 206 and remains in the first chamber 208.

The water vapor is discharged from the second chamber 210 of the membrane unit 201 through a first outlet 218. The condenser 202 includes a second inlet 220 that receives the water vapor discharged from the membrane unit 201. In the condenser 202, heat is transferred from the water vapor to the relatively cool feedwater flowing through the condenser 202, thereby cooling and condensing the vapor into clean, treated liquid. This condensed liquid, which is the recovered liquid 24, is discharged from the condenser 202 through a second outlet 222.

The liquid, non-vaporized feedwater remaining in the first chamber 208, which has a higher concentration of solids than the feedwater entering the condenser 202, is discharged therefrom through a second outlet 224 as the pre-concentrated feedwater 26. As depicted in FIG. 4, a portion of this discharge can be recirculated and mixed with the incoming feedwater being fed to the condenser 202 through the first inlet 212.

Membrane distillation can achieve higher recovery rates over a much broader and higher range of salinity concentrations than conventional reverse osmosis technology. Membrane distillation has definite advantages over reverse osmosis systems for applications where waste heat is available, the feedwater salinity is not constant, and/or a higher degree of pre-concentration is desired.

Figure 5:
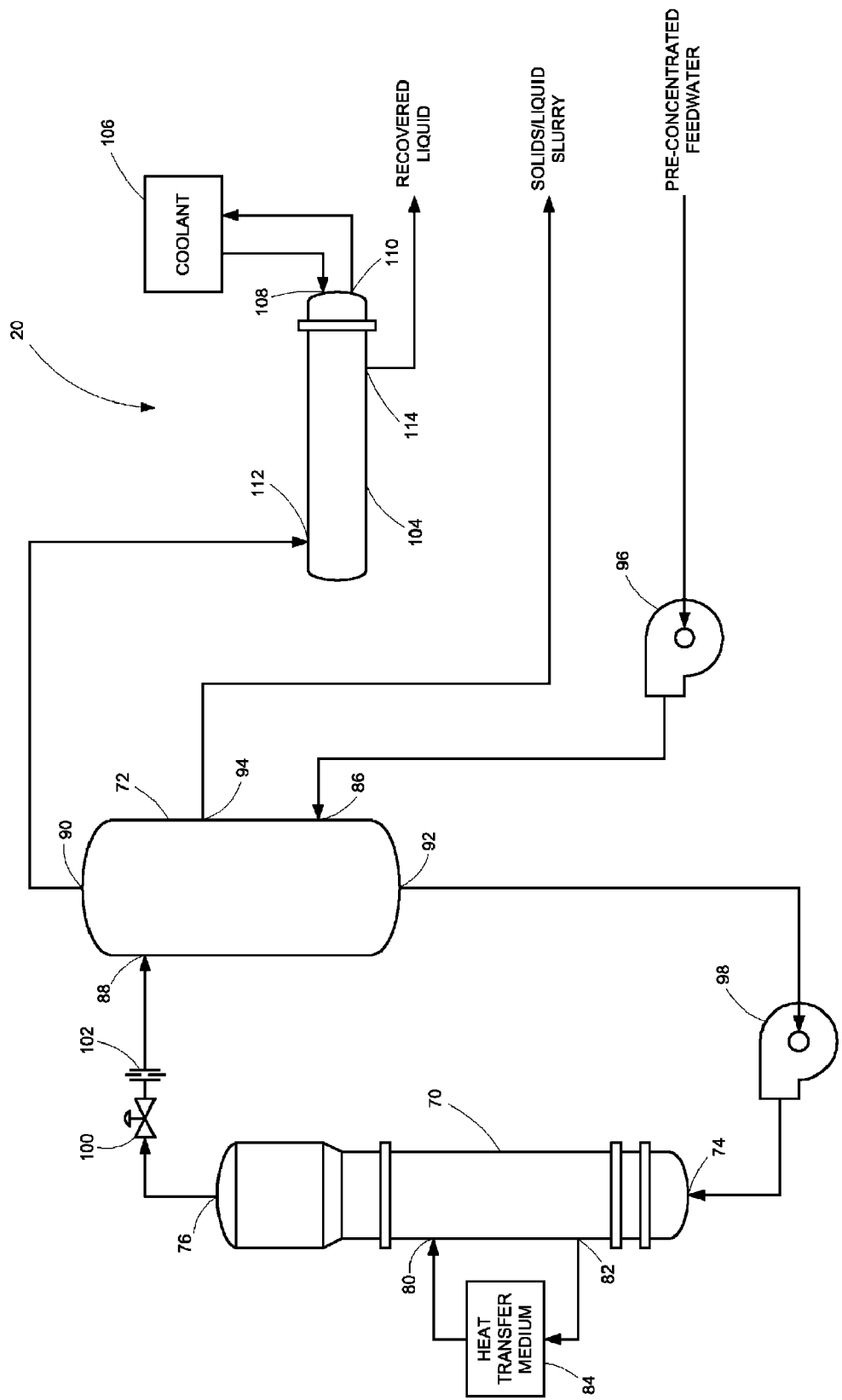
FIG. 5 is a schematic view of one embodiment of a second-stage subsystem that can be used in the system of FIG. 1.

Referring to FIG. 5, one possible embodiment of the second-stage subsystem 20 includes a fluidized bed heat exchanger (FBHX) unit 70 and a flash concentrator column 72 connected in a recirculation loop. The FBHX unit 70 comprises a vertically oriented vessel enclosing a fluidized bed flowpath and a heat transfer medium flowpath in fluid isolation from the fluidized bed flowpath. In the illustrated embodiment, the FBHX unit 70 includes a first inlet 74 located at the bottom of the vessel and a first outlet 76 located at the top of the vessel and in fluid communication with the first inlet 74. A fluidizable bed of abrasive, inert solid particles (not shown in FIG. 5), such as glass beads or pieces of chopped wire, is provided in the flowpath between the first inlet 74 the first outlet 76. The FBHX unit 70 further includes a second inlet 80 and a second outlet 82 in fluid communication with the second inlet 80. A heat transfer medium (from a heat transfer medium source 84) flows in through the second inlet 80 and exits through the second outlet 82.

The flash concentrator column 72 comprises a closed cylindrical vessel in a vertical orientation. In the illustrated embodiment, the flash concentrator column 72 has a first inlet 86 located near the bottom of the vessel and a second inlet 88 located near the top of the vessel. As will be described in more detail below, the second inlet 88 is configured to promote a tangential entry of a two-phase mixture. A first outlet 90 is located the top of the vessel, a second outlet 92 is located at the bottom of the vessel and a third outlet 94 is located in the side of the vessel. The pre-concentrated feedwater 26 discharged by the first-stage subsystem 18 (not shown in FIG. 5) is fed to the first inlet 86 of the flash concentrator column 72 via a feed pump 96. This pre-concentrated feedwater 26 is mixed with additional feedwater in the flash concentrator column 72, and the resulting concentrated feedwater is discharged through the second outlet 92. This concentrated feedwater is fed to the first inlet 74 of the FBHX unit 70 by a recycle pump 98. The concentrated feedwater flows upward through the fluidized bed flowpath where it mixes with the abrasive, inert solid particles to form a fluidized mixture and is heated by the heat transfer medium flowing through the heat transfer medium flowpath.

Heating the concentrated feedwater causes certain dissolved solid constituents therein to be converted to suspended solids, dependent upon the solubility and crystallization characteristics of the dissolved solids constituents. For example, many salts commonly found in industrial wastes and brines, such as calcium carbonate ($CaCO_3$), calcium sulfate ($CaSO_4$), and magnesium hydroxide (MgOH), have "inverse solubility" characteristics, meaning they become less soluble and precipitate at increased temperatures. Solid constituents having inverse solubility characteristics are referred to hereinafter as "inverse solubility solids." The newly suspended solids are easier to separate cyclonically than dissolved solids but will tend to form deposits on the internal (i.e., fluidized bed side) heat transfer surfaces. However, the inert solid particles produce a scouring action that substantially prevents the accumulation and deposition of these suspended solids in the fluidized bed flow path.

The concentrated feedwater is discharged from the FBHX unit 70 at a high temperature and pressure through the first outlet 76 and flows through a flow control valve 100. The flow control valve 100 maintains the hot concentrated feedwater at a sufficient pressure to effectively suppress boiling. The concentrated feedwater then flows through an orifice 102 or similar flash device so that a portion of the liquid component thereof is vaporized to produce a two-phase (liquid and vapor) mixture that is directed into the flash concentrator column 72 through the second inlet 88. The flash concentrator column 72 is maintained at a significantly reduced pressure relative to the pressure at the outlet of the FBHX unit 70. To reach equilibrium, a portion of the liquid concentrated feedwater in the two-phase mixture is "flashed-off" or vaporized at the reduced pressure within the flash concentrator column 72. This vapor is discharged from the flash concentrator column 72 through the first outlet 90. As mentioned above, the second inlet 88 is configured to promote a tangential entry of the two-phase mixture. The tangential entry into the flash concentrator column 72 creates a swirling motion of the two-phase mixture that causes the suspended solids to move towards the wall of the flash concentrator column 72. This promotes the cyclonic separation of a solids/liquid slurry 30 from the remaining (i.e., non-vaporized) mixture. The solids/liquid slurry 30 is discharged through the third outlet 94 and is directed to the third-stage subsystem 22 for the final separation of solids from the slurry 30. The remaining mixture constitutes a further concentrated feedwater that gravitates downward where it is mixed with the pre-concentrated feedwater 26 entering the flash concentrator column 72 through the first inlet 86.

The vapor discharged from the first outlet 90 of the flash concentrator column 72 is directed to a condenser 104 having coolant from a coolant source 106 flowing in through a first inlet 108 and exiting through a first outlet 110. The condenser 104 includes a second inlet 112 that receives the vapor discharged from the flash concentrator column 72. In the condenser 104, heat is transferred from the vapor to the coolant, thereby cooling and condensing the vapor into clean, treated liquid. This condensed liquid, which is the recovered liquid 28, is discharged from the condenser 18 through a second outlet 114. Any suitable coolant, such as cooling water, air or a refrigerant, can be used in the condenser 104. In one embodiment, raw feedwater from the source 14 can be used as the coolant.

Figure 6:
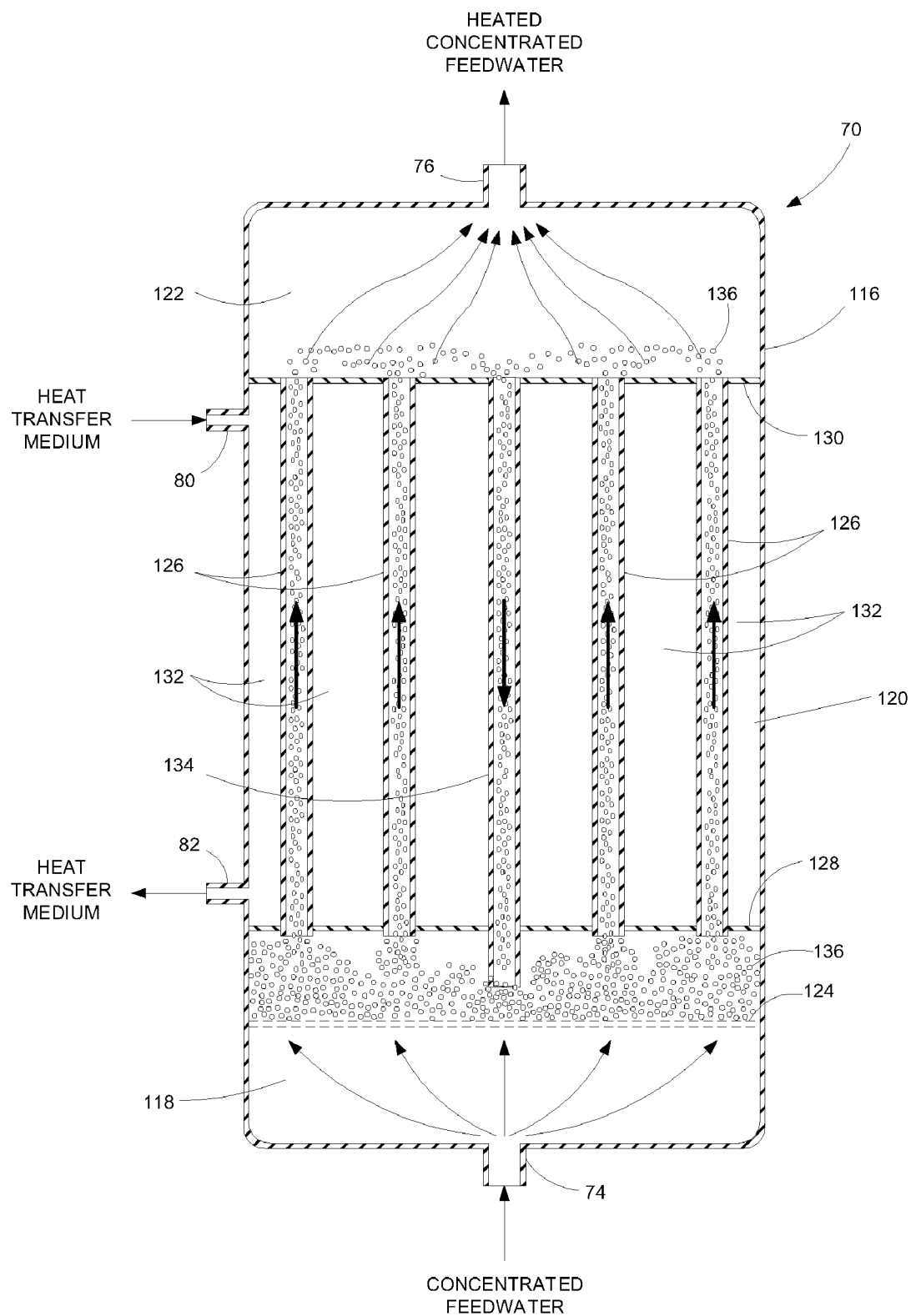
FIG. 6 is a schematic view of one embodiment of a fluidized bed heat exchanger unit that can be used in the second-stage subsystem of FIG. 5.

FIG. 6 shows one possible embodiment of the FBHX unit 70 in more detail. In this embodiment, the FBHX unit 70 comprises an elongated vessel 116 having the above-mentioned first inlet 74, first outlet 76, second inlet 80, and second outlet 82. The vessel 116 is partitioned into three longitudinally arranged chambers: a lower chamber 118, a middle chamber 120, and an upper chamber 122. The first inlet 74 feeds into the lower chamber 118. A distribution plate 124 is horizontally disposed across the lower chamber 118 above the first inlet 74, effectively horizontally bisecting the lower chamber 118. The middle chamber 120 is provided with a plurality of substantially parallel open-ended riser tubes 126, which are vertically disposed within the middle chamber 120. The lower ends of the tubes 126 are open to the lower chamber 118, while the upper ends of the tubes 126 are open to the upper chamber 122. A lower tube plate 128 is positioned proximal to the lower ends at the interface between the lower and middle chambers 118, 120. An upper tube plate 130 is correspondingly positioned proximal to the upper ends at the interface between the middle and upper chambers 120, 122. The tubes 126 are spatially separated from one another, providing an interstitial space 132 between the tubes 126. The lower tube plate 128 and the upper tube plate 130 prevent fluid communication between the interstitial space 132 and the lower and upper chambers 118, 122, respectively.

The first inlet 74 opens into the lower chamber 118, and the first outlet 76 exits from the upper chamber 122. Thus, the first inlet 74, the lower chamber 118, the tubes 126, the upper chamber 122, and the first outlet 76 define the fluidized bed flowpath.

The second inlet 80 opens into an upper portion of the middle chamber 120, and the second outlet 82 exits from a lower portion of the middle chamber 120. Both the second inlet 80 and the second outlet 82 are in fluid communication with the interstitial space 132 so that the second inlet 80, the interstitial space 132, and the second outlet 82 define the heat transfer medium flowpath. The heat transfer medium flowpath is in fluid isolation from the lower and upper chambers 118, 122 and the interiors of the tubes 126, which define the fluidized bed flowpath. However, the external surfaces of the tubes 126 are in fluid contact with the heat transfer medium flowpath at the interface between the tubes 126 and the interstitial space 132.

An internal downcomer 134 is vertically disposed within the middle chamber 120. The internal downcomer 134 is in substantially parallel alignment with the tubes 126 and, in the embodiment illustrated in FIG. 6, is centrally disposed within the middle chamber 120. The internal downcomer 134 has a lower end that is open to the lower chamber 118 and an upper end that is open to the upper chamber 122.

A fluidizable bed of solid particles 136 is provided in the upper portion of the lower chamber 118 above the distribution plate 124. The solid particles 136 are formed from a substantially inert, hard, abrasive material, such as chopped metal wire, gravel, or beads formed from glass, ceramic or metal. The distribution plate 124 allows feedwater to pass through but prevents the particles 136 from falling through.

In operation, concentrated feedwater from the flash concentrator column 72 enters the FBHX unit 70 through the first inlet 74 and is conveyed upward through the distribution plate 124. The concentrated feedwater entrains some of the solid particles 136 to form a fluidized mixture comprising the concentrated feedwater and solid particles 136. The fluidized mixture passes from the lower chamber 118 upward into the open lower ends of the tubes 126 and through the tube interiors within the middle chamber 120. The heat transfer medium is simultaneously conveyed into the middle chamber 120 via the second inlet 80, passes downward through the interstitial space 132, and is discharged through the second outlet 82. The heat transfer medium is in continuous contact with the external surfaces of the tubes 126 during its descent through the interstitial space 132, while the fluidized mixture is in continuous contact with the internal surfaces of the tubes 126 during its ascent through the middle chamber 120. The tubes 126 are formed from a heat conductive material so that heat is transferred from the heat transfer medium to the fluidized mixture. As discussed above, heating the fluidized mixture will convert dissolved inverse solubility solids to suspended solids. The solid particles 136 experience turbulent flow while fluidized within the tubes 126, causing the solid particles 136 to collide with the internal surfaces of the tubes 126. The collisions produce a scouring action, diminishing the ability of the suspended solids to accumulate on the internal tube surfaces and displacing any suspended solids that adhere thereto. Thus, the solid particles 136 substantially prevent or reduce fouling or plugging of the tube interiors caused by scaling of suspended solids.

The fluidized mixture continues out the open upper ends of the tubes 126 into the upper chamber 122. When the fluidized mixture reaches the upper chamber 122, it disperses causing the more dense solid particles 136 to separate by gravity from the concentrated feedwater. The solid particles 136 in the upper chamber 122 return to the lower chamber 118 by falling under the force of gravity through the internal downcomer 134. The heated concentrated feedwater is discharged from the FBHX unit 70 through the first outlet 76 and conveyed to the flash concentrator column 72 (not shown in FIG. 6).

FIG. 6 shows just one possible embodiment of the FBHX unit 70, which embodiment has only a single internal downcomer 134. Alternatively, a large FBHX unit 70 could be provided with multiple downcomers strategically located to provide internal recirculation of the solid particles. Furthermore, many other embodiments are possible. For instance, instead of an internal downcomer, the FBHX unit could use an external downcomer located outside of the vessel for recirculating solid particles from the upper chamber to the lower chamber. In addition, a FBHX unit having a stationary bed of solid particles could also be used.

Figure 7:
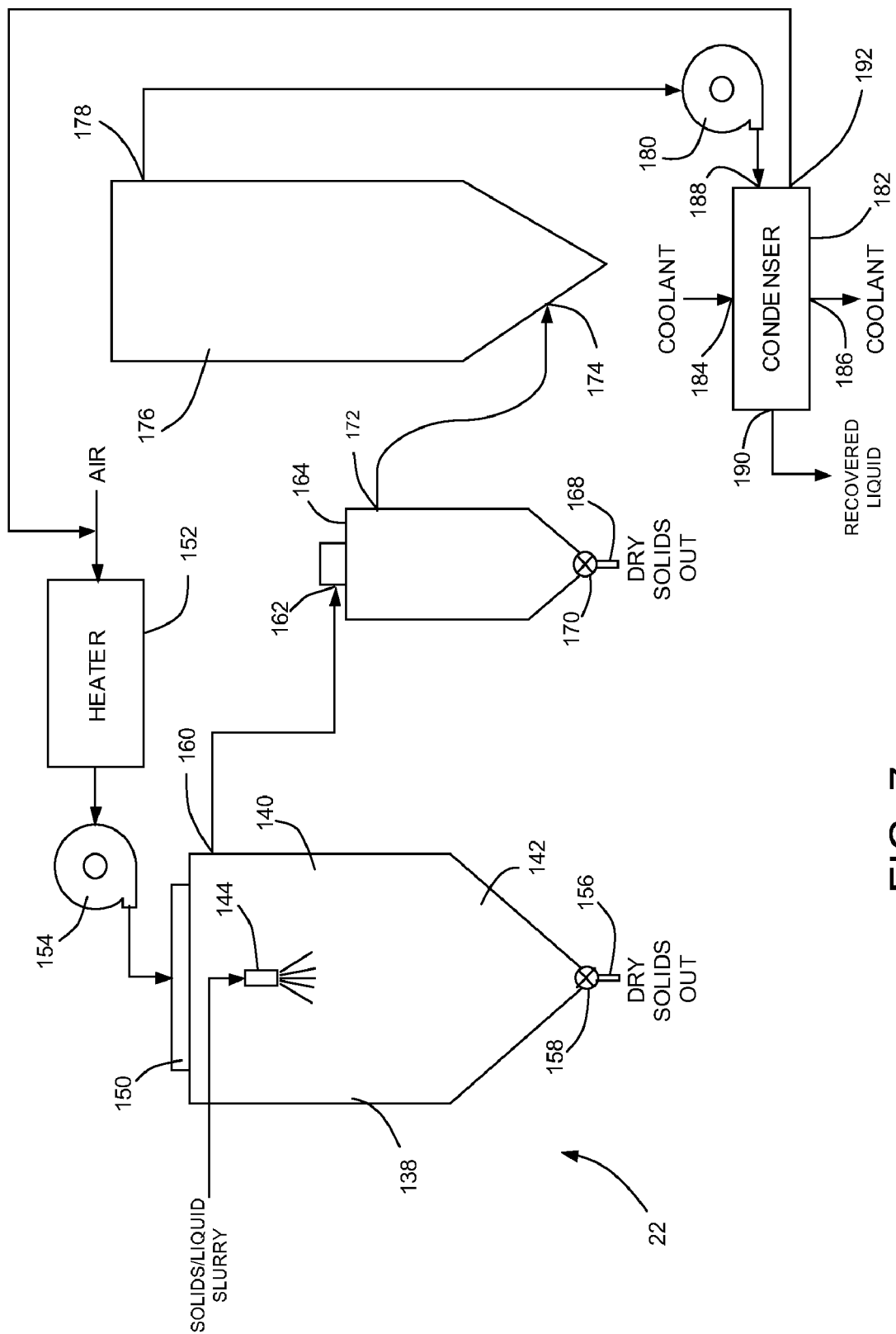
FIG. 7 is a schematic view of one embodiment of a third-stage subsystem that can be used in the system of FIG. 1.

FIG. 7 shows one possible embodiment of the third-stage subsystem 22. In this case, the third-stage subsystem 22 is a spray dryer that includes an evaporation chamber 138 comprising a vertically oriented vessel having a cylindrical upper section 140 and a conical lower section 142. One or more devices for atomizing the slurry 30, referred to herein as atomizers 144 (only one shown in FIG. 7), are located near the top of the evaporation chamber 138 in the upper section 140. The solids/liquid slurry 30 output from the second-stage subsystem 20 is conveyed, such as by a pump (not shown), under pressure to the atomizers 144 inside the evaporation chamber 138.

Figure 8:
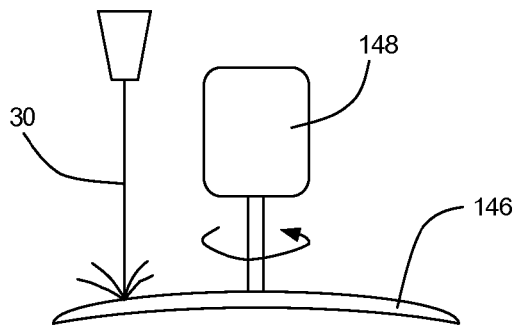
FIG. 8 is a schematic view of one embodiment of a spinning disc-type atomizer that can be used in the third-stage subsystem of FIG. 7.

The atomizers 144 can comprise various devices such as non-pneumatic spray nozzles, pneumatic spray nozzles or high-speed spinning wheels or discs. In a non-pneumatic spray nozzle, feedwater is atomized by being forced through a relatively small diameter orifice under the pressure. In a pneumatic spray nozzle, feedwater is forced through a relatively small diameter orifice with a jet of compressed air that is also supplied to the nozzle. Referring to FIG. 8, a spinning disc-type atomizer includes a spinning disc 146 that is driven at high speeds by a motor 148. A stream of the slurry 30 is directed to impinge on the spinning disc 146. As the slurry 30 impinges on the spinning disc 146, it undergoes shear forces that atomize the slurry 30 into a fog or mist of fine droplets.

The choice of atomizer is dependent on the flow rate and characteristics of the slurry to be treated. For example, pneumatic spray nozzles are generally more applicable for low flow rates, while non-pneumatic spray nozzles are generally more applicable for higher flow rates. It is principally an economic decision as to which type is used based on energy considerations associated with air compressor horsepower (for pneumatic spray nozzles) and higher hydraulic feed pressure that requires higher horsepower pumps (for non-pneumatic spray nozzles). A spinning disc-type atomizer, which does not utilize a small diameter orifice, is less susceptible to clogging. These atomizers therefore can be more applicable for treating slurry having suspended particles that would easily clog or plug spray nozzles. The use of a spinning disc-type atomizer would require less stringent pre-filtration and consequently be less costly.

Referring again to FIG. 7, an inlet 150, such as a manifold, is provided on top of the evaporation chamber 138 for introducing a downward flowing stream of hot air into the evaporation chamber 138. The heated air is produced by a heater 152, which heats ambient air to a desired temperature. Heated air from the heater 152 is blown through the hot air inlet 150 by an inlet fan 154. The heater 152 can be a burner that generates hot air by burning any suitable fuel including, but not limited to, propane, natural gas, oil, methane, and biomass. Alternatively, the heater 152 can be a heat exchanger that heats incoming air with a heat source such as steam or waste heat (e.g., exhaust from an industrial process). Other energy sources such as solar or nuclear energy are also possible. The air should be heated to a temperature sufficient to achieve rapid, full vaporization of the high concentration slurry 30.

In operation, the slurry 30 is pumped to the atomizers 144 which disperse the slurry 30 in the form of a fog or mist of fine droplets into the stream of hot air. The liquid portion of the droplets undergoes rapid evaporation in the evaporation chamber 138, resulting in the separation of solids (that were formerly dissolved or suspended in the droplets) from the vapor phase of the liquid. Larger precipitated particles settle by gravity to the conical lower section 142 of the evaporation chamber 138. The dry solids thus collected in the lower section 142 can be discharged from the evaporation chamber 138 through a first solids outlet 156 located at the bottom of the lower section 142. A valve 158 is provided for opening and closing the first solids outlet 156. In one embodiment, the valve 158 can be operated on a timer for periodically opening the first solids outlet 156 to dump dry solids into an appropriate collection container or conveyor (not shown). The collected dry solids can thus be an output product of the system 10. The vapor and any smaller particles still entrained in the vapor exit the evaporation chamber 138 through a vapor outlet 160 located near the top of the evaporation chamber 138. The cylindrical shape and vertical orientation of the evaporation chamber 138 provide uniform disbursement of the sprayed slurry as well as effective utilization of the entire chamber volume. The vertical arrangement with the atomizers 144 located near the top of the evaporation chamber 138 enhances the ability to rely on gravity for the settling and collection of the larger precipitated particles.

The vapor outlet 160 of the evaporation chamber 138 is connected via a suitable conduit to the inlet 162 of a conventional cyclone separator 164. The cyclone separator 164 separates additional solids from the vapor and discharges these dry solids through a second solids outlet 168 located at the bottom of the cyclone separator 164. As with the first solids outlet 156, the second solids outlet 168 is provided with a valve 170 that can be opened to dump dry solids from the cyclone separator 164. These dry solids can be combined with the dry solids discharged from the evaporation chamber 138. The vapor and any residual particles entrained in the vapor exit the cyclone separator 164 through a vapor outlet 172.

The vapor outlet 172 of the cyclone separator 164 is connected to the inlet 174 of a conventional bag filter 176, which removes the residual solids from the vapor. Cleansed vapor is drawn from the bag filter 176 through a vapor outlet 178 by an exhaust fan 180. The bag filter 176 can be omitted for some applications depending on the physical characteristics of the dry solids, the removal efficiency of the cyclone separator 164, and applicable air and/or water emission standards.

The third-stage subsystem 22 further includes a condenser 182 having a coolant flowing in through a first inlet 184 and exiting through a first outlet 186. The condenser 182 includes a second inlet 188 that is connected via a suitable conduit to the vapor outlet 178 of the bag filter 176. In the condenser 182, heat is transferred from the vapor to the coolant passing through the condenser 182 via the first inlet 184, thereby cooling and condensing the vapor into clean, treated liquid. This condensed liquid is discharged from the condenser 182 through a second outlet 190. The liquid can thus be recovered for any suitable use. Any suitable coolant, such as cooling water, air or a refrigerant, can be used in the condenser 182. In one embodiment, feedwater from the source 14 is used as the coolant. In this case, raw feedwater would be routed from the source 14 to the first condenser inlet 184 and heated feedwater would exit via the first outlet 186. A fraction of the heated feedwater discharged from the condenser 182 would be pumped by the supply pump 12 to the first-stage subsystem 18. The remaining portion of the feedwater discharged from the condenser 182 would be returned to the source 14. Using the feedwater as the condenser coolant has the advantage of heating the feedwater before it is delivered to the first-stage subsystem 18, thereby resulting in more efficient processing.

Residual warm air from the condensed vapor is discharged through a third outlet 192 of the condenser 182. While this residual warm air could be simply vented to the atmosphere, it is preferably directed to the inlet of the heater 152 so as to preheat the incoming ambient air and thereby increase the overall efficiency of the system 10 by reducing the energy requirements for heating the air. Depending on applicable air and/or water emission standards, the vapor discharged from the bag filter 176 could be exhausted to the atmosphere as an alternative to being condensed. In many applications, the amount of liquid in this vapor will be minimal, as most of the liquid will be recovered in the first-stage and second-stage subsystems.

Figure 9:
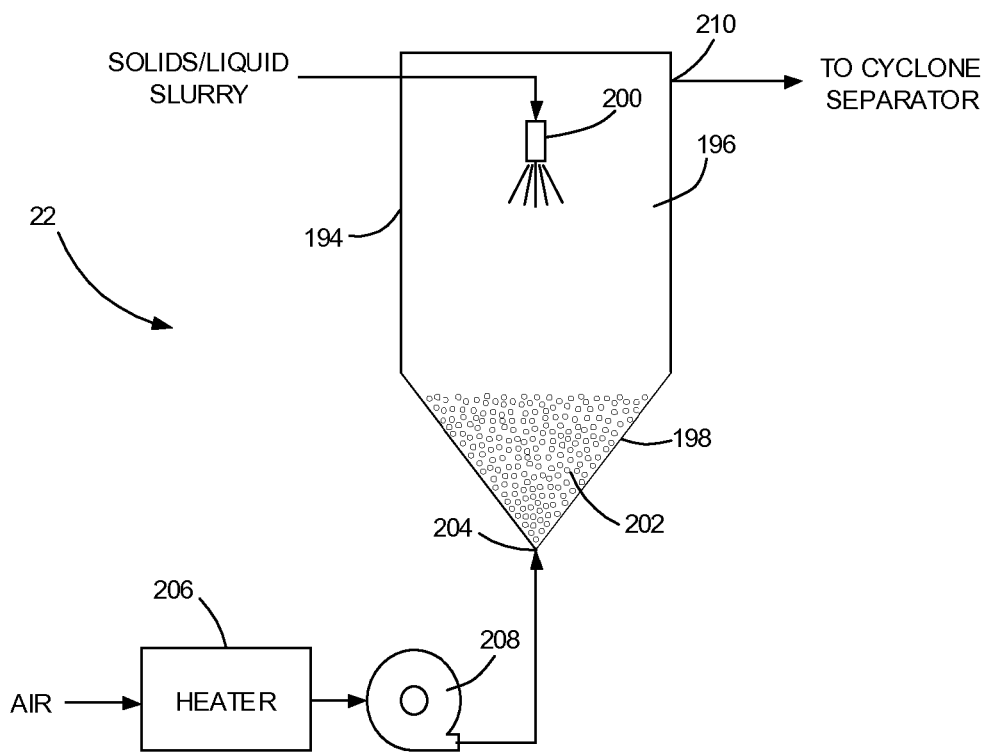
FIG. 9 is a schematic view of another embodiment of a third-stage subsystem that can be used in the system of FIG. 1.

FIG. 9 shows another possible embodiment of the third-stage subsystem 22. In this case, the third-stage subsystem 22 is a fluidized bed spray dryer that includes an evaporation chamber 194 comprising a vertically oriented vessel having a cylindrical upper section 196 and a conical lower section 198. One or more atomizers 200 (only one shown in FIG. 9) for atomizing the slurry 30 are located near the top of the evaporation chamber 194 in the upper section 196. The solids/liquid slurry 30 output from the second-stage subsystem 20 is conveyed, such as by a pump (not shown), under pressure to the atomizers 200 inside the evaporation chamber 138. The atomizers 200 can include any suitable device, such as those described above in connection with FIGS. 7 and 8. A fluidized bed of solid particles 202, which can comprise sand, chopped metal wire, gravel, or beads formed from glass, ceramic or metal, is disposed in the lower section 198.

An inlet 204, such as a manifold, is provided for introducing an upward flowing stream of hot air into the evaporation chamber 194 through the bottom of the lower section 198. The heated air is produced by a heater 206, which heats ambient air to a desired temperature. Heated air from the heater 206 is blown through the hot air inlet 204 by an inlet fan 208 and passes through the fluidized bed of solid particles 202 and into the upper section 196. The air should be heated to a temperature sufficient to achieve rapid, full vaporization of the high concentration slurry 30.

In operation, the slurry 30 is pumped to the atomizers 200 which disperse the slurry 30 in the form of a fog or mist of fine droplets into the stream of hot air. The liquid portion of the droplets undergoes rapid evaporation in the evaporation chamber 194, resulting in the separation of solids (that were formerly dissolved or suspended in the droplets) from the vapor phase of the liquid. Larger precipitated particles settle by gravity to the fluidized bed of solid particles 202 in the lower section 198. The scouring action created by the stream of hot air being forced through the fluidized bed of solid particles 202 causes the precipitated particles to slough off and become entrained in the vapor exiting the evaporation chamber 194 through a vapor outlet 210 located near the top of the evaporation chamber 194.

The vapor with entrained solids discharged from the evaporation chamber 194 can be further treated in a cyclone separator and bag filter, in the manner described below, to separate the entrained solids from the vapor. The separated vapor can then be condensed and recovered as purified liquid, or alternatively can be discharged to the atmosphere as contaminate-free vapor. The cyclone separator, bag filter and condenser could be the same as those described above in connection with FIG. 7 as are thus not shown or described in detail here.

While specific embodiments of the present invention have been described, it should be noted that various modifications thereto can be made without departing from the spirit and scope of the invention as defined in the appended claims.

What is claimed is:

1. A system for treating feedwater comprising:
   a fluidized bed heat exchanger unit connected to receive feedwater;
   means for pre-concentrating feedwater received by said fluidized bed heat exchanger unit;
   a flash concentrator column connected to receive feedwater discharged from said fluidized bed heat exchanger unit, said flash concentrator column including a first inlet for receiving feedwater from said means for pre-concentrating, a second inlet for receiving feedwater discharged from said fluidized bed heat exchanger unit, a first outlet for discharging vapor, a second outlet for discharging feedwater, and a third outlet for discharging a solids/liquid slurry, wherein said fluidized bed heat exchanger unit includes an inlet for receiving feedwater discharged from said second outlet of said flash concentrator column and an outlet for discharging heated feedwater;
   a spray dryer connected to receive said solids/liquid slurry discharged from said flash concentrator column, and
   a flash device located between said outlet of said fluidized bed heat exchanger unit and said second inlet of said flash concentrator column.

2. The system of claim 1 wherein said means for pre-concentrating includes a membrane distillation system.

3. The system of claim 2 wherein said membrane distillation system includes a membrane unit having at least one hydrophobic membrane.

4. The system of claim 1 further comprising a fluidized bed of solid particles disposed in a lower section of said spray dryer.

5. The system of claim 1 wherein said means for pre-concentrating includes a reverse osmosis system.

6. The system of claim 1 wherein said means for pre-concentrating includes a mechanical vapor recompression evaporator system.

* * * * *